US007516142B2

(12) United States Patent
Friedlander et al.

(10) Patent No.: US 7,516,142 B2
(45) Date of Patent: Apr. 7, 2009

(54) SYSTEM, METHOD, AND PROGRAM PRODUCT FOR OPTIMIZING A RESEARCH AND GRANT PORTFOLIO

(75) Inventors: Robert R. Friedlander, Southbury, CT (US); Anwer Mujahid Khan, Irvine, CA (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/239,609

(22) Filed: Sep. 29, 2005

(65) Prior Publication Data

US 2007/0073754 A1    Mar. 29, 2007

(51) Int. Cl.
*G06F 7/00* (2006.01)
*G06F 17/00* (2006.01)
(52) U.S. Cl. .............................. 707/101; 707/3; 707/6; 705/7
(58) Field of Classification Search .................. None
See application file for complete search history.

(56) References Cited

U.S. PATENT DOCUMENTS 6,647,374 B2    11/2003   Kansal ......................... 705/37

| | | | |
|---|---|---|---|
| 2001/0034362 A1 | 10/2001 | Wilkinson | 705/8 |
| 2003/0088491 A1* | 5/2003 | Liu et al. | 705/36 |
| 2003/0097291 A1 | 5/2003 | Freedman | 705/8 |
| 2003/0220830 A1* | 11/2003 | Myr | 705/10 |
| 2003/0220860 A1* | 11/2003 | Heytens et al. | 705/35 |
| 2006/0105830 A1* | 5/2006 | Nemitz et al. | 463/17 |

OTHER PUBLICATIONS

Smith et al., "Collaborative Approaches to Research", HEFCE Fundamental Review of Research Policy and Planning, Final Report, Apr. 2000.*

* cited by examiner

*Primary Examiner*—Tim T Vo
*Assistant Examiner*—Jay A Morrison
(74) *Attorney, Agent, or Firm*—John R. Pivnichny; Law Office of Jim Boice

(57) ABSTRACT

Method, system, and program product for managing research grants. This is done by capturing at least one grant description into a database. Next one or more of researcher capability, researcher availabilities, and research subject availabilities are entered into the database. The grant description is then text mined to identify matches between the grant descriptions and the data items. Then a gain is defined and determined for each such match. This gain is then tabulated.

22 Claims, 3 Drawing Sheets

SYSTEM, METHOD, AND PROGRAM PRODUCT FOR OPTIMIZING A RESEARCH AND GRANT PORTFOLIO

BACKGROUND

1. Field of the Invention

The present invention relates generally to grant supported research projects, particularly to clinical research and, more particularly to a computer-implemented system and method for matching research grant sponsors, specific research grants, research assets (including staff and staff capabilities, subjects and equipment), and researchers, and assessing the added value of the project to the researcher and institution.

2. Background of the Invention

Research organizations are in major part driven by a research grant schedule of responding to requests for grant proposals, receiving the grants, doing the research, publishing the research, and responding to subsequent requests for grant proposals. The funding may come from external sources or from internally budgeted funds.

In order to properly respond to requests for grant proposals and to submit grant proposals, it is necessary to keep track of what grants are available, what researchers are available, what their skill sets are, what equipment is available, and what research subjects and objects are available. Moreover, these inputs must be matched to the requests for grant proposals. Heretofore, this collection of inputs and matching of inputs, along with matching the inputs and the possible institutional benefits, has been done in a very haphazard manner, such as white boards, spreadsheets, and PC based database management tools.

It is clear that bringing some degree of order and discipline to this process would provide a research institution with a competitive advantage.

SUMMARY OF THE INVENTION

These and other problems are obviated by the method, system, and program product described herein. Specifically, the invention described herein provides a method, system, and program product for keeping track of available grants, available researchers and their skill sets, available equipment, and available research subjects and objects, and matching these inputs in an ordered and disciplined process.

The method, system, and program product captures at least one grant description into a database. Next one or more of available researchers, researcher capabilities and skill sets, research subject and object availabilities, and research equipment availabilities are entered into the database. These data items frequently contain both discrete and semantic data and are processed by, for example, unstructured information management architecture tools. The grant description is then text mined to identify matches between the grant descriptions and the data items. Then an institutional gain is defined and determined for each such match. This gain is then tabulated.

The data may be entered into the database manually, by data mining, or by database querying, text mining, or various analytic tools, such as unstructured information management analysis tools. Then, various data mining, optimization, and analysis tools may be used to allow optimization of various research grants with respect to institutional goals and rewards. Optimization may utilize either or both discrete and semantic data. Optimization may be delivered to institutional review boards (IRBs), administrators and researchers for grant proposal preparation.

THE FIGURES

Various aspects of the invention are illustrated in the figures appended hereto.

DETAILED DESCRIPTION OF THE INVENTION

Figure 1:
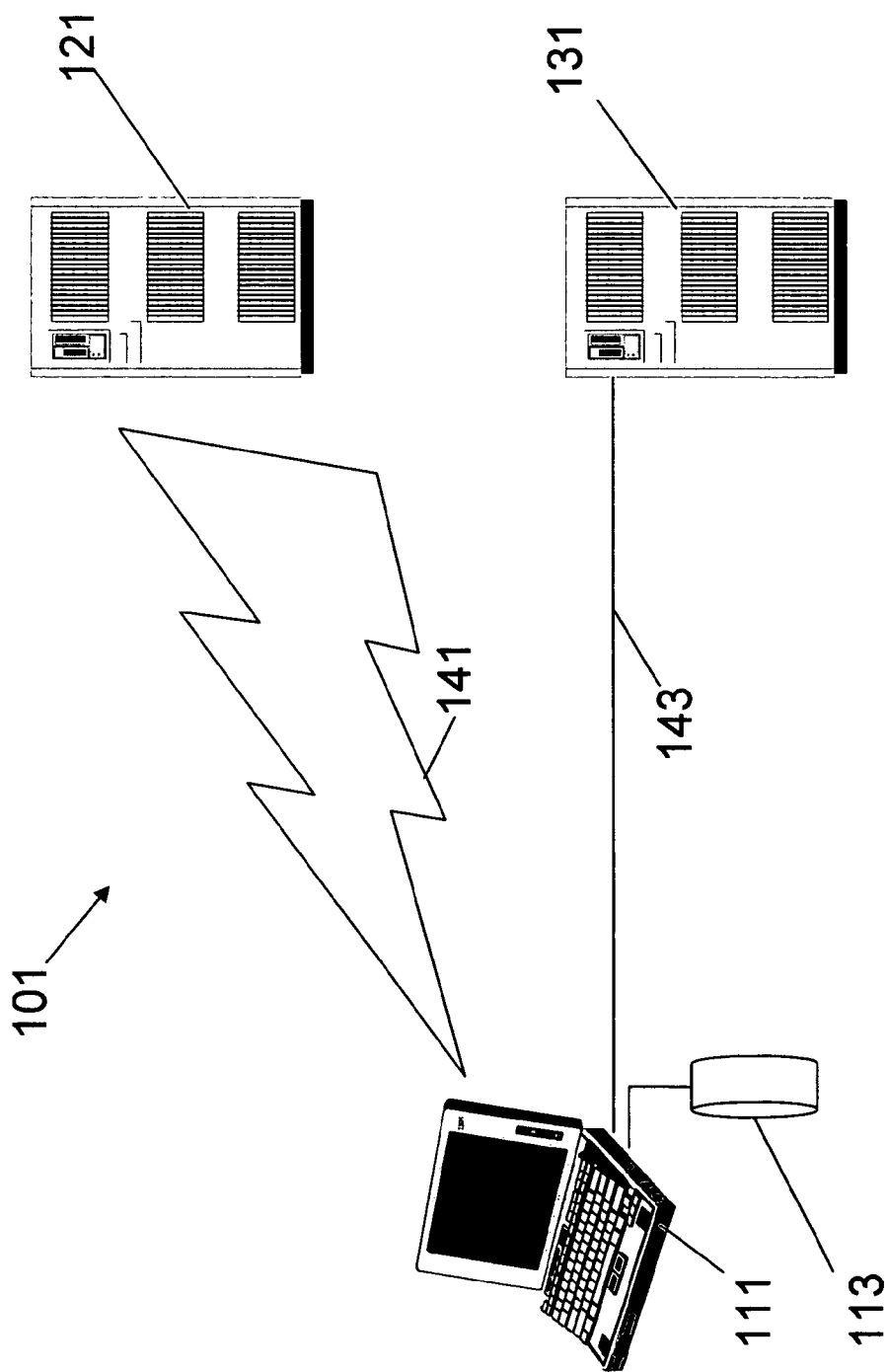
FIG. 1 is an illustration of a computer terminal with access to data bases and database management systems, and network and internetwork connectivity for carrying out the methods of the invention.

These and other problems are obviated by the method, system, and program product described herein. Specifically, the invention described herein provides a method of, system for, and program product for managing research grants. This is done by capturing at least one grant description into a database. Next one or more of researcher capabilities, researcher availabilities, and research subject availabilities are entered into the database.

At a further level of granularity the research output of the researchers is parsed or mined to find areas of demonstrated research interest. This typically involves, among other measures, measures of reputation, such as journal weights.

At a parallel level of granularity, research capabilities and research availabilities are extracted, and mined. This may include, strictly by way of example, specialized equipment such as mass spectrometers, super computers, imaging technologies, and capabilities for protein proteomics and protein folding.

The grant description is then text mined to identify matches between the grant descriptions and the data items. Then a gain is defined and determined for each such match. This gain is then tabulated.

The gain, as used herein, encompasses Institutional Review Board policies and guidelines, organizational policies, guidelines, and goals, future opportunities (such as the need to "buy in" at a loss as a "gateway" to later gains), licensing possibilities, and the like.

The method, system, and program product provide for the entry of all relevant data. This could be done by manual entry or by one or more automated entry methods, such as from the web, from e-mails, or by text mining. The data can then be entered into one or more databases. Querying the database for matches of announcements, resources, and assets can allow optimization of potential research versus available assets and resources to potential payoffs. This involves multiple query algorithms and optimization algorithms. In one embodiment potential researchers are notified of research opportunities and available resources and assets. In a further embodiment, researchers are provided with tools to prepare applications and proposals response to the grant announcements.

For each data input stream, the method, system, and program product allow manual input, e.g., through a web based interface, as well as automated parsing of grant announcements, grant availability databases, etc.

The atomic data from all of the inputs is entered into a suitable data mining data such as a constellation schema or star schema or similar queryable schema or structure, with conformal dimensions, e.g., for data mining from a data warehouse. Working from such schema in a data warehouse, various optimization algorithms are enabled to match research to resources and assets. This facilitates self learning.

By way of exemplification and not limitation, the optimization functions are typically of the type "maximize or minimize a sum of functions of the inputs subject to a set of constraints to derive an optimized objective function. Exemplary are Linear Programming type optimization, as described for example in Linear Programming and Extensions by George Dantzig.

Automated and manual notifications are made to Institutional Review Board members, other administrators, and researchers. Records are kept of research in progress, resources being consumed, and the benefits to be accrued. This information is stored, tracked, trended, analyzed, and displayed as required.

Adjustments may be made to the algorithms based on outcomes to improve payout through time.

FIG. 1 is an illustration of a computer system 101 including a computer terminal 111 having input means (as shown by the keyboard and connections 141 and 143), output means (as shown by connections 141 and 14) with access to data bases on associated memory 113 and on internet linked servers 121 and LAN connected servers 131. The databases may include database management systems. The terminal 111 has LAN connectivity 143 and internet connectivity 141 for carrying out the methods of the invention.

Figure 2:
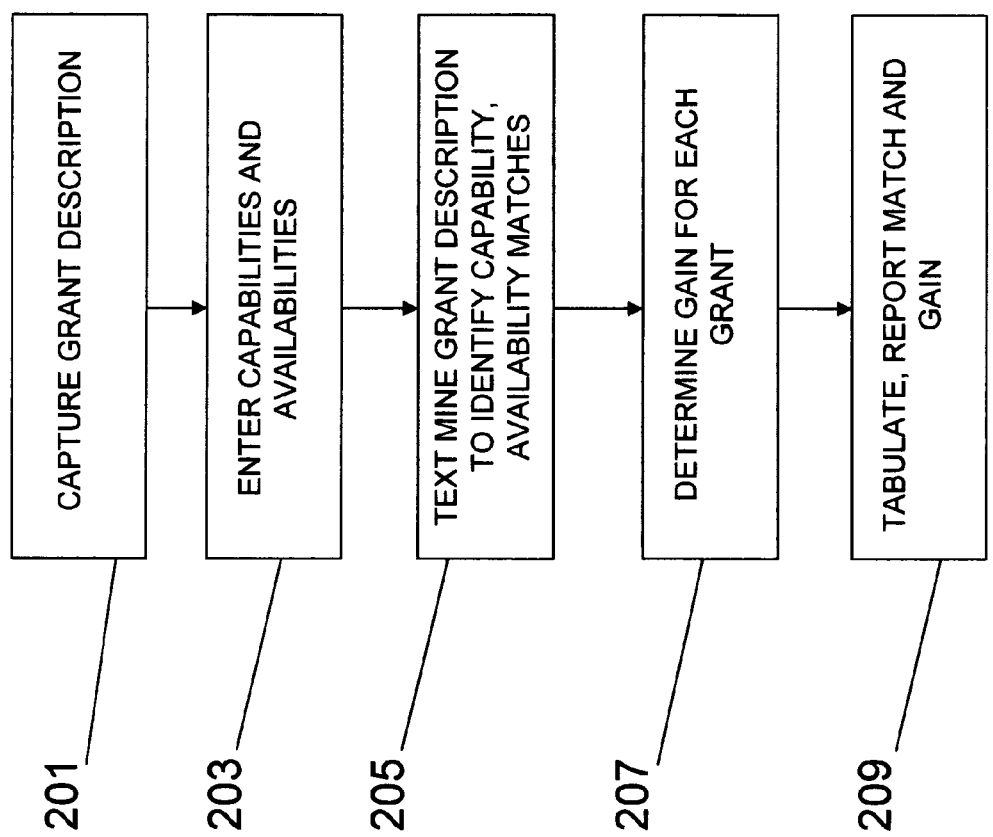
FIG. 2 is a flow chart of a method of the invention.

FIG. 2 is a flow chart of a method of the invention. The first step, illustrated in FIG. 2 is the step of capturing at least one grant description 201 of a plurality of grant descriptions into a database. The next step is entering capabilities and availabilities into a database 203. This step consists of entering at least one or more of researcher capability, researcher availability, and research subject or object availability into the database. The next step is a step of text mining 205 at least one or more of the grant description to identify a match between the grant description and the data items, and using the results of the text mining to determine the gain of the match between the data item and grant description 207. The gain is typically one or more of financial gain, prestige, future opportunities, and royalty streams. While not specifically shown in the flow chart, the gain is optimized by an optimizing objective function. The match and gain are tabulated and reported 209.

Figure 3:
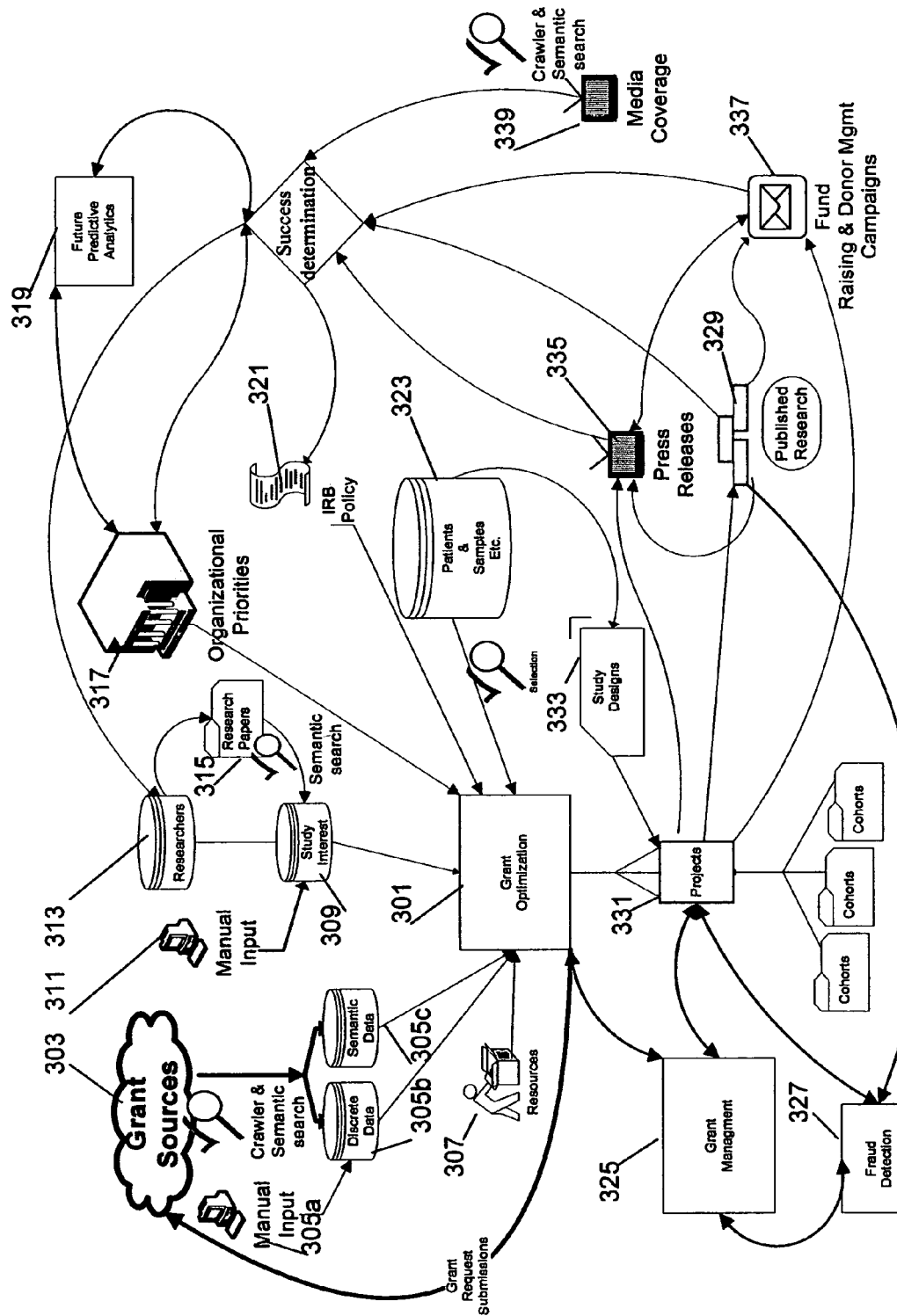
FIG. 3 is a high level view of the various claimants to the grant process within a research institution and their interactions

FIG. 3 is a high level view of the various claimants to the grant process within a research institution and their interactions. The method, system, and program product starts with and arrives at grant optimization 301. Initially, grant sources 303 are interrogated for grant data, such as manually entered data 305a, discrete data 305b, and semantic data 305c. Other inputs to the grant optimization process 301 are resources 307, and study interests 309. Study interests 309 may be manually entered 311, provided by researchers 313 (as by CV and resume scans, course offerings, and the like and a scan of research papers 315).

These inputs are combined with organizational priorities 317, which may, in turn, be determined future predictive analytics 319 and institutional review board policies 321. A still further input is objects and subjects, that is, patients and samples 323.

The method, system, and program product of our invention working through grant optimization stage 301 determine the gain of the match between the data items, above, and the grant description 305a, 305b, and 305c. The gain is typically one or more of financial gain, prestige, future opportunities, and royalty streams, as determined by the organizational priorities 317 and IRB policies 321. While not specifically shown in the diagram, the expected gain from a specific grant and from a set of grants is optimized 301 by an optimizing objective function. The match and gain are tabulated and reported to grant management 325.

Fraud detection tools 327 work through grant management 325 with data from published research 329.

The availability of subjects and objects, 323, e.g., patients, is an input to study designs 333, which is, in turn, an input to the project 331 and grant management 325. The grant management stage 325 and the grant optimization stage 301 are, in turn, an input to project design 331.

The study design from the project management stage 331 generates downstream outputs, such as press releases 335, fund raising and donor appeals 337, and media coverage 399, which along with other data items provide a measure of success determination 341.

The data retrieved and processed may be one or both of discrete or semantic, with both the totality of the data and the individual items of data being one or both of discrete or semantic. This type of data may be effectively managed by UIMA.

As used herein UIMA means the Unstructured Information Management Architecture. UIMA is an open, industrial-strength, scaleable and extensible platform for creating, integrating and deploying unstructured information management solutions from combinations of semantic analysis and search components. One solution is IBM's Unstructured Information Management Architecture (UIMA). IBM's Unstructured Information Management Architecture (UIMA) is a component-based software architecture for developing UIM applications.

An unstructured information management (UIM) application may be generally characterized as a software system that analyzes large volumes of unstructured information (both discrete and semantic) in order to discover, organize, and deliver relevant knowledge to the end user. An example is an application that processes millions of medical abstracts to discover critical drug interactions. Another example is an application that processes tens of millions of documents to discover evidence of probable terrorist activities.

Unstructured Information Management Architecture (UIMA) is an open framework for building analytic applications—to find latent meaning, relationships and relevant facts hidden in unstructured text. UIMA defines a common, standard interface that enables text analytics components from multiple vendors to work together. It provides tools for either creating new interoperable text analytics modules or enabling existing text analytics investments to operate within the framework.

In analyzing unstructured content, UIM applications make use of a variety of technologies including statistical and rule-based natural language processing (NLP), information retrieval, machine learning, ontologies, and automated reasoning. UIM applications may consult structured sources to help resolve the semantics of the unstructured content. For example, a database of chemical names can help in focusing the analysis of medical abstracts. A database of terrorist organizations and their locations can help in analyzing documents for terror-related activities.

A UIM application generally produces structured information resources that unambiguously represent content derived from unstructured information input. These structured resources are made accessible to the end user through a set of application-appropriate access methods. A simple example is a search index and query processor that makes documents quickly accessible by topic and ranks them according to their relevance to key concepts specified by the user. A more complex example is a formal ontology and inference system that, for example, allows the user to explore the concepts, their relationships, and the logical implications contained in a collection consisting of millions of documents.

A further tool is Semantic Search. Semantic Search is a class of document retrieval that allows the user to exploit the results of UIMA analysis to create much more effective queries—queries that can hone in on exactly what you are looking for.

IBM WebSphere® Information Integrator (II) OmniFind Edition provides a UIMA compliant processing engine and rich platform for deploying text analytic solutions. A wide range of powerful text analytics can be used together to extract concepts, facts, and relationships from text helping organizations get more insight and value from enterprise content assets. This facilitates taking discrete and semantic data as inputs and provide an output that may be further processed in an optimization tool, as an integer optimization tool, or, preferably an optimization tools that can optimize semantic and discrete data with respect to objective functions that contain discrete and semantic objectives.

Text analytics can analyze documents, comment and note fields, problem reports, e-mail, web sites and other text-based information sources. Extracted information can be used to enhance the quality of search results, or analyzed alongside traditional data as part of business intelligence and data warehousing applications to provide a more complete view of operations, opportunities and risks.

UIMA architectures, applications, and platforms may be used with an optimization application that can process and optimize both discrete and semantic data (such as the data retrieved and presented by UIMA)

IBM WebSphere® Information Integrator (II) OmniFind Edition provides a UIMA compliant processing engine may be used for web crawling and for the semantic search of grant sources 303 to obtain the semantic data 305c therefrom. IBM WebSphere® Information Integrator (II) OmniFind Edition also provides a UIMA compliant processing engine can also be used to search the researchers' database 313 and research papers 315 in a semantic search to determine a researcher's study interests 309 for input to the grant optimization process 301.

A further aspect of the method, system, and program product is a feedback mechanism for self optimization. That is, which grants were suggested to which researcher, which grants were awarded, and what was the performance of the project 331. This is followed by tracking secondary and tertiary measures of success, such as the actual published research 329, press releases 335, fund raising success 337, media coverage 339, all as inputs, through success determination 341, to the grant optimization process 301. It is noted that the grant award leverages these secondary and tertiary measures of success, and that this is even the case with grants that initially appear to be money losers.

The invention may be implemented, for example, by having the system for managing a grant portfolio as a program product. This is accomplished by executing the method as a software application, in a dedicated processor or processors, or in a dedicated processor or processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for securing and accessing digital data as a software application.

This signal-bearing medium may comprise, for example, memory in a server. The memory in the server may be non-volatile storage, a data disc, or even memory on a vendor server for downloading to one or more processors for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of managing research grants, said method comprising the steps of:
    a) capturing a grant description into a database, wherein the grant description describes project requirements for a project that is to be funded by an available grant;
    b) entering data items into a database, wherein the data items include descriptors of:
        i) researcher capability of researchers working with an enterprise,
        ii) researcher availability of the researchers working with the enterprise,
        iii) research subject availability of research subjects that are to be studied in the project that is to be funded by the available grant, and
        iv) equipment availability of specialized equipment needed to meet the project requirements of the project that is to be funded by the available grant;
    c) text mining said at least one grant description to identify a match between said grant description and said data items, wherein the match is derived by an unstructured information management (UIM) application being applied to the grant description and the data items in the database, and wherein the UIM application identifies and matches the project requirements to an enterprise research capacity that is described by the data items in the database;
    d) determining a financial gain that will result from the enterprise undertaking the project that is to be funded by the available grant;
    e) tabulating said match and said financial gain; and
    f) delivering tabulated matches and gains to an institutional review board (IRB) for use by the enterprise in preparing a grant proposal that matches the grant.

2. The method of claim 1, comprising entering a plurality of grant descriptions into the database.

3. The method of claim 1, wherein the data items contain discrete and semantic data.

4. The method of claim 1, wherein the financial gain includes prestige, future opportunities, and royalty streams to the enterprise.

5. The method of claim 1, further comprising:
optimizing the financial gain by an optimizing objective function.

6. The method of claim 1, wherein the database comprises discrete and semantic data items, the method further comprising:
optimizing the financial gain by discrete and semantic optimization tools.

7. The method of claim 1, wherein the specialized equipment includes mass spectrometers, super computers, imaging technologies, and capabilities for protein proteomics and protein folding.

8. The method of claim 1, wherein the subject availability describes an availability of patients to be studied in a research project that is funded by the available grant.

9. The method of claim 1, further comprising:
in response to the enterprise undertaking the project, tracking secondary success derived from undertaking the project, wherein the secondary success includes published research articles, press releases, fund raising success, and future grant awards.

10. A system for determining and reporting the match and gain from a research project comprising a computer having input, output, a processor, and memory, and including a database and a database management system, said system further comprising:
a) data entry means for capturing a grant description into the database, wherein the grant description describes project requirements for a project that is to be funded by an available grant, and for entering the following data items into the database:
   i) researcher capability of researchers working with an enterprise,
   ii) researcher availability of researchers working with the enterprise,
   iii) research, subject availability of research subjects that are to be studied in the project that is to be funded by the available grant, and
   iv) equipment availability of specialized equipment needed to meet project requirements of the project that is to be funded by the available grant;
b) processing means for text mining said grant description to identify a match between said grant description and said data items, wherein the match is derived by an unstructured information management (UIM) application being applied to the grant description and the data items in the database, and wherein the UIM application identifies and matches the project requirements to an enterprise research capacity that is described by the data items in the database;
c) means for determining a financial gain that would result from the enterprise undertaking the project that is described in the available grant; and
d) means for tabulating said match and said financial gain
e) delivering tabulated matches and gains to an institutional review board (IRB) for use by the enterprise in preparing a grant proposal that matches the grant.

11. The system of claim 10, wherein the data entry means is adapted for receiving a plurality of grant descriptions into the database.

12. The system of claim 10, wherein the data contains discrete and semantic data.

13. The system of claim 10, wherein the financial gain includes prestige, future opportunities, and royalty streams to the enterprise.

14. The system of claim 10, further comprising:
objective function means for optimizing the financial gain.

15. The system of claim 10 wherein the data comprises discrete and semantic data, and wherein the objective function comprises discrete and semantic objective function optimization means.

16. The system of claim 10, wherein the specialized equipment includes mass spectrometers, super computers, imaging technologies, and capabilities for protein proteomics and protein folding.

17. The system of claim 10, wherein the subject availability describes an availability of patients to be studied in a research project that is funded by the available grant.

18. A tangible machine-readable storage medium on which is stored program product comprising code for directing a computer system to carry out a method of managing research grants by the steps of:
a) capturing a grant description into a database, wherein the grant description describes project requirements for a project that is to be funded by an available grant;
b) entering data items into a database, wherein the data items include descriptors of:
   i) researcher capability of researchers working with an enterprise,
   ii) researcher availability of the researchers working with the enterprise,
   iii) research subject availability of research subjects that are to be studied in the project that is to be funded by the available grant, and
   iv) equipment availability of specialized equipment needed to meet the project requirements of the project that is to be funded by the available grant;
c) text mining said at least one grant description to identify a match between said grant description and said data items, wherein the match is derived by an unstructured information management (UIM) application being applied to the grant description and the data items in the database, and wherein the UIM application identifies and matches the project requirements to an enterprise research capacity that is described by the data items in the database;
d) determining a financial gain that will result from the enterprise undertaking the project that is to be funded by the available grant;
e) tabulating said match and said financial gain; and
f) delivering tabulated matches and gains to an institutional review board (IRB) for use by the enterprise in preparing a grant proposal that matches the grant.

19. The program product of claim 18, further comprising code for entering a plurality of grant descriptions into the database.

20. The program product of claim 18, wherein the financial gain includes prestige, future opportunities, and royalty streams to the enterprise.

21. The program product of claim 18, further comprising program code for objective optimization of the financial gain from discrete and semantic data.

22. The program product of claim 18, wherein the subject availability describes an availability of patients to be studied in a research project that is funded by the available grant.

* * * * *